April 2, 1963 J. F. TAPLIN 3,083,734
ROLLING SEAL DIAPHRAGM
Filed July 29, 1959
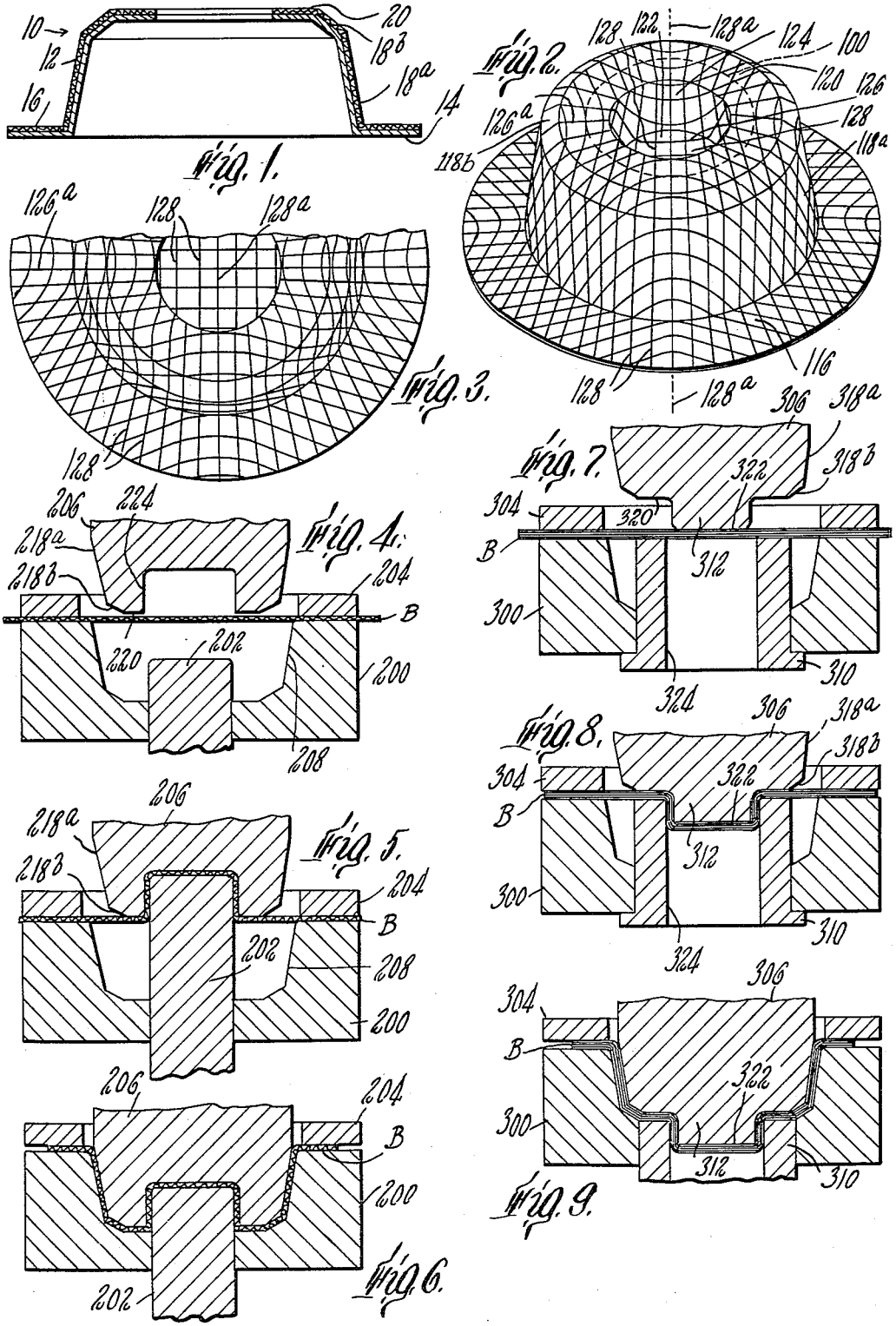

United States Patent Office 3,083,734
Patented Apr. 2, 1963

3,083,734
ROLLING SEAL DIAPHRAGM
John F. Taplin, 15 Sewall St., West Newton, Mass.
Filed July 29, 1959, Ser. No. 830,388
3 Claims. (Cl. 137—795)

This invention relates to rolling seal diaphragms characterized by exceptionally high peripheral extensibility along the entire height of the rolling wall thereof, as well as to a novel method for making the same and a novel fabric element useful in making up the novel rolling seal diaphragms. The present invention represents an improvement over the invention disclosed in my Patent No. 2,849,026, dated August 26, 1958, in which the character of rolling seal diaphragms, as well as particular modes of use thereof, are discussed generally.

In general, it is an object of the present invention to provide an improved rolling seal diaphragm characterized by a constant mean effective area over the entire range of displacement in use; capable of being freely moved to any position within the entire range of its stroke or displacement in use; free from axial extensibility; capable of substantially frictionless rolling action in use; free from any substantial spring gradient when formed into convoluted or folded shape for rolling seal diaphragm action; and free positioning with complete relaxation in all locations within its range of stroke or displacement.

In particular, it is an object of the present invention to provide substantial circumferential extensibility throughout the entire height of the rolling wall of a rolling seal diaphragm and to provide rolling seal diaphragms capable of increased service life, with less wear per unit of use than heretofore possible.

Other objects, advantages and features will appear from the following description of preferred embodiments of the invention, taken together with the attached drawing, in which:

FIG. 1 is a vertical cross section through an unconvoluted rolling seal diaphragm representing a preferred embodiment of the invention;

FIG. 2 is an isometric view of a centrally untrimmed fabric element according to the invention;

FIG. 3 is a partial plan view of said centrally untrimmed fabric element;

FIGS. 4, 5 and 6 respectively illustrate successive steps in making the fabric element of FIG. 2; and FIGS. 7, 8 and 9 are respective successive steps in a modification of the method of the invention.

Referring now more particularly to the drawing, there is shown in FIG. 1 a preferred embodiment of a rolling seal diaphragm according to the invention. This diaphragm, which is indicated generally at 10, includes a fabric layer 12 and an elastomer layer 14. The elastomer layer 14 is not only closely adherent to the fabric layer 12 throughout, but indeed the elastomer permeates the fabric layer 12 completely therethrough. The rolling seal diaphragm 10 includes an outwardly directed annular flange 16, a rolling wall 18a and 18b, and an inwardly directed annular flange 20.

In FIGS. 2 and 3 there is shown a fabric element according to the invention prior to the adherence to the elastomer layer 14 and permeation with elastomer, and prior also to cutting along the dotted line 100 to remove the central portion of the fabric element. There is shown an outwardly directed flange 116, rolling wall portions 118a and 118b, and an inwardly directed annular flange portion 120, all corresponding to the portions 16, 18a, 18b and 20 of FIG. 1.

The fabric element of FIGS. 2 and 3 is formed from a woven fabric, the threads of which are diagrammatically shown spaced widely apart for clarity of illustration. Prior to cutting along the line 100, the fabric element includes a flat central portion 122 in a plane perpendicular to the axis of the element. See also FIG. 5, which shows the fabric element in inverted cross section. Extending upwardly from the portion 122 is a generally cylindrical portion 124, which at the top thereof intersects the inwardly directed flange portion 120. The fabric element of FIGS. 2 and 3 is formed by circumferential compression of a flat piece of woven fabric, without however extending substantially any of the fibers or threads therein, but on the contrary rearranging them according to the method hereinafter described. The central flat portion 122 is free from circumferential compression throughout, and all the warp threads 126 bear a 90° relationship to all the woof threads 128 throughout the portion 122 just as in the original flat woven blank (see FIG. 4) from which the element was formed. Circumferential compression begins however at the bottom of the portion 124 and increases in extent of compression progressively toward the top of that portion, progressively still further from the top of that portion through the annular portion 120 toward the wall portion 118b, progressively still further in said portion 118b as portion 118a is approached, and progressively still more throughout the portion 118a as the same approaches nearer and nearer the outwardly directed flange portion 116. It will be seen thus that substantial circumferential compression exists throughout the rolling wall portions 118a and 118b not only around the outermost or bottom periphery thereof (at the junction with the outwardly directed flange portion 116), but also at the innermost or top periphery thereof (at the junction of portions 118b and 120).

As will be seen, the axial warp thread 126a and the axial woof thread 128a, which intersect substantially upon the axis of the fabric element, each defines a plane passing through the axis of the fabric element. These two planes, which will be hereinafter referred to respectively as the axial-warp defined plane and the axial-woof defined plane intersect along the axis of the fabric element and are perpendicular to each other therealong.

As will also appear from FIGS. 2 and 3, on each side of the axis of the fabric element non-axial woof threads or fibers 128 define arches symmetrical about the axial warp thread 126a, and with apices pointing inwardly. Said arched woof threads 128 extend throughout the portions 124, 120, 118b, 118a, and 116. Similarly, non-axial warp threads or fibers 126 on each side of the axial warp thread 126a, are arched symmetrically relative to the axial woof thread 128a, again with the apices of the arches inwardly directed, and with said arches extending throughout the portions 124, 120, 118b, 118a and 116. Between the axial warp thread 126a and the axial woof thread 128a, in all four quadrants of the fabric element, warp threads 126 and woof threads 128 intersect in a generally diamond pattern, again in all the portions 124, 120, 118b, 118a and 116. In the zones of these diamond patterns, some circumferential extensibility is achieved owing to the fact that here the fabric is being tensioned on the bias.

As above indicated, circumferential compression begins at the bottom of the portion 124 and increases progressively and continuously outwardly therefrom over the top 120 of the element, down its rolling wall 118b and 118a, and out the flange 116 to the outer extremity of the element. It is this circumferential compression which rearranges the threads 126 and 128 into the pattern of arches and diamonds above referred to, and as the amount of circumferential compression increases as progress is made outwardly of the element, the degree of circumferential extensibility of each element (which substantially corresponds thereto) correspondingly increases. Thus, circumferential extensibility is greater at the top of the portion 124 than toward the bottom thereof. Again, circumferential extensibility is greater in the portion 120 than anywhere in the portion 124; greater throughout the rolling wall portion 118b than anywhere in the top portion 120, and is greater throughout the rolling wall portion 118a than along any circumference of the rolling wall portion 118b. At the same time, the element is free from axial compression. Indeed, any possible tendency in the original fabric to possible axial extension in certain areas thereof has been removed (see the following discussion of the method) so that in use the fabric element provides a reinforcement insuring against any axial change of length. As is well known in the art and more particularly described in my patent above referred to, circumferential extensibility in the portions 120 and 116 is not really material inasmuch as the rolling seal diaphragm is ordinarily gripped at these two portions following convolution, so that in use circumferential extension and relaxation occur only in the rolling wall 118a–b, which alternately rolls from a piston onto and off of a surrounding cylinder spaced perhaps a tenth of an inch therefrom therearound.

Before or after trimming the fabric element along the line 100, I assemble thereto the elastomer layer 14; for example, according to either of the modes described in my above-referred-to patent, preferably so that in the finished rolling seal diaphragm there is not only a layer of fabric-free elastomer 14 adherent to the fabric element 12, but also the elastomer permeates the fabric element 12 filling all the interstices among the threads 126 and 128 thereof.

Although in the preferred embodiment the fabric element is formed from a flat loomed or woven fabric, it may also suitably be formed from other flat fabric with fibers interlocking so that circumferential (or peripheral) stretching or extension of the rolling wall is not permitted substantially beyond the extent of the above described compression (and any bias or the equivalent), to avoid ballooning in the unsupported convolution in use therein; for example, flat knitted fabrics may be used. Suitable fabric materials include nylon, Orlon, Dacron and glass, depending mainly on the temperature requirements in use of the rolling seal diaphragm. Similarly, the elastomer used may be rubber, synthetic rubber or a silastic, depending upon the requirements of the end use desired.

A presently preferred embodiment of my new method for making fabric elements of the character above described is illustrated in FIGS. 4, 5 and 6, which show respectively successive steps in practice of the method. In FIG. 4 is shown a heated cylinder 200, a heated ram 202 mounted for slidably upward movement relative thereto, a slip ring (or pressure pad) 204, and a heated plunger 206 mounted for downward movement relative to the cylinder 200, the axes of said cylinder, ram and plunger being coincident. The upper surface of the cylinder 200 and the lower surface of the slip ring 204 are smooth so that the fabric blank B shown therebetween may slide freely. However, the slip ring 204 is downwardly biased (by spring or air pressure means, for example) an amount sufficient to prevent the blank B doubling upon itself, thus avoiding at all points any condition in which the fabric overlies itself or is pleated upon itself in such a way that three thicknesses thereof occur at a single point. The plunger 206 is provided with an axially inwardly directed blind hole 224 of diameter larger than the ram 202 to permit said ram to force said fabric into said hole. In the embodiment shown, the plunger 206 is provided with beveled surfaces 218a and 218b and with an end surface 220. The cylinder 200 is provided with female correspondingly shaped surfaces with only the slight size variations made necessary by the fact that at the end of the downward stroke of the plunger 206 the cylinder is spaced therefrom by the thickness of the fabric of the blank B.

In practicing this preferred embodiment of my new method I first place the flat fabric blank B between the cylinder 200 and the plunger 206, as shown in FIG. 4. I next move ram 202 upwardly to engage said blank and force the same into the hole 224 of plunger 206 to accomplish a first draw, meantime holding plunger 206 against vertical movement.

Thereafter, while holding the plunger 206 and ram 202 together with the blank B therebetween and without permitting any relative movement therebetween, I move said plunger and ram downwardly together to seat the plunger 206 in the mating hole 208 of the cylinder 200 to accomplish a second draw, the blank B being held therebetween.

I retain all three parts in the last-mentioned position sufficiently long to set the blank into the configuration induced therein by the circumferential compression (as above described) induced by forming a blank among these three die portions in the manner described. Nylon, Orlon and Dacron are of course all three heat settable, and thus may be set in the configuration given them by the die portions 200, 202 and 206 by means of the heated ram 202, and plunger 206 and cylinder 200. More conventional fabrics, such as cotton, may be treated with starch or otherwise to achieve the desired heat settability.

Thereafter, the ram 202 and plunger 206 are returned to the positions of FIG. 5 and the finished fabric element, shown in inverted cross section in FIG. 6, is removed.

In the modified embodiment of the method shown in three successive steps in FIGS. 7 through 9, four blanks are simultaneously formed. A plunger 306 is mounted for downward movement relative to a cylinder 300 and a movable female die 310. The plunger 306 includes a ram portion 312 of diameter smaller than the inside diameter of the hole 324 in movable female die 310. Adjacent the ram portion 312 of the plunger 306 is a shoulder 320 adapted to cooperate with the top surface of a movable die 310 to hold the four blanks B therebetween upon deformation thereof by the ram portion 312. The movable female die 310 is upwardly biased so that the same remains in its initial position until the ram portion 312 is fully introduced into the hole 324. Thereafter, downward force is exerted on the plunger 306 sufficient to, acting through the shoulder 320, force the movable die 310 downwardly, the latter moving slidably in the cylinder 300. This action continues until the surfaces 318a and 318b of the plunger 306 come to rest against the four blanks B which are in turn supported by the corresponding interior surfaces of the cylinder 300. The slip ring 304 is downwardly biased, and the surfaces engaging the blanks is downwardly biased, and the surfaces engaging the blanks B above and below are smooth. Also as above described, slidable inward movement of the blanks is permitted while at the same time they are held flat, and pleating or doubling upon themselves is prevented. The plunger 306, the die 310 and the cylinder 300 are heated, and all three die parts are retained in their final position as shown in FIG. 9 until the blanks B are set in the configuration given them by the die parts 300, 306 and 310. Thereafter, before or after assembly of the elastomer layer above described, the fabric elements are trimmed to provide a central hole in the top thereof, eliminating the portions thereof formed adjacent the surfaces 322 of the plunger 324 of the movable female die.

In a typical embodiment of my method, I may form a fabric element with a first draw of 1 inch diameter and a rolling wall portion about 3 inches in its largest diameter, using Dacron 50 x 50 basket-weave fabric. Both draws are accomplished at a constant rate of one-fifth inch per second; the maximum die force required is at the start of the second or larger draw, and may be of the order of 150 pounds. The pressure pad is downwardly biased at 15 p.s.i. The die parts are at 375° F., and following formation of the blank may be held in position three seconds to set the formed element in the configuration given it thereby.

By means of my new method, fabric element and rolling seal diaphragm, as above described, I have provided the art with a rolling seal diaphragm in which, while there is greater circumferential or peripheral compression, and therefore extensibility along the bottom or outer periphery of the rolling wall, there is peripheral or circumferential compression and thus extensibility also along the entire upper or inner periphery of the rolling wall. This provision of substantial circumferential extensibility throughout the entire rolling wall, even including the top periphery thereof, greatly diminishes injurious wear in use and prolongs considerably the life of the rolling seal diaphragm. Rolling seal diaphragms according to the present invention are of particular value in unusually severe applications of use.

It will be understood that where I have referred to peripheral or rolling wall circumferential extensibility above, I have in every case reference to rolling walls which are limitedly circumferentially extensible, said rolling walls being peripherally extensible an amount corresponding substantially to the amount of circumferential or peripheral compression placed therein (as well as some extensibility on the bias or the equivalent). Also, as above noted, the rolling walls of rolling seal diaphragms made according to the present invention are free from any substantial component of longitudinal or axial extensibility, the method of manufacture above described removing any latent such extensibility while at the same time inducing circumferential compression as above described. It should of course be understood that all the above is accomplished without substantially stretching any individual thread. Rather, the threads are rearranged by the dies, the weakening which would be incident upon stretching being completely avoided.

It will be apparent that modifications within the spirit of the invention and the scope of the claims will readily occur to those skilled in the art. For example, the rolling wall may be of simple-conical configuration, or cylindrical, rather than double-conical as in the embodiment herein described. And the first-drawn portion of the blank, later to be cut off, may be of any desired shape, including for example hemispherical. Also, beads adjacent the rolling wall may serve as flanges for holding the same in position for use.

I claim:

1. A woven fabric element formed of interlocking warp threads and woof threads, said element being circular in cross section and including a rolling wall portion and a flat, inwardly directed flange portion extending from the innermost periphery thereof, said rolling wall portion and flange portion being in circumferential compression, the axial warp and woof threads being perpendicular to each other, non-axial woof threads on each side of the axis of said element throughout the same being arched symmetrically about said axial warp thread, warp threads on each side of the axis of said element throughout the same being arched symmetrically about said axial woof thread, and non-axial warp threads defining with non-axial woof threads throughout said element a generally diamond pattern in each of the four quadrants formed by said axial warp thread and said axial woof thread.

2. A rolling seal diaphragm including a rolling wall and an integral inwardly directed flat annular flange around the top circumference thereof comprising a layer of fabric of the type having interlocking fibers and adherent thereto, a fluid-tight layer of elastomer, said layer of fabric being non-extensible longitudinally of said wall, being in circumferential compression throughout said wall including said top circumference, and being in circumferential compression in said flange.

3. A rolling seal diaphragm including a rolling wall and an integral circumferential flange around the top thereof, said rolling wall and flange comprising a layer of fabric of the type having interlocking fibers and, adherent thereto, a fluid-tight layer of elastomer, said layer of fabric being non-extensible longitudinally of said wall and being in circumferential compression throughout said wall and in said flange.

References Cited in the file of this patent

UNITED STATES PATENTS

| | | |
|---|---|---|
| 2,106,791 | Brisson | Feb. 1, 1938 |
| 2,285,967 | Hardy | June 9, 1942 |
| 2,304,989 | Snowdon | Dec. 15, 1942 |
| 2,849,026 | Taplin | Aug. 26, 1956 |